Figure 1:
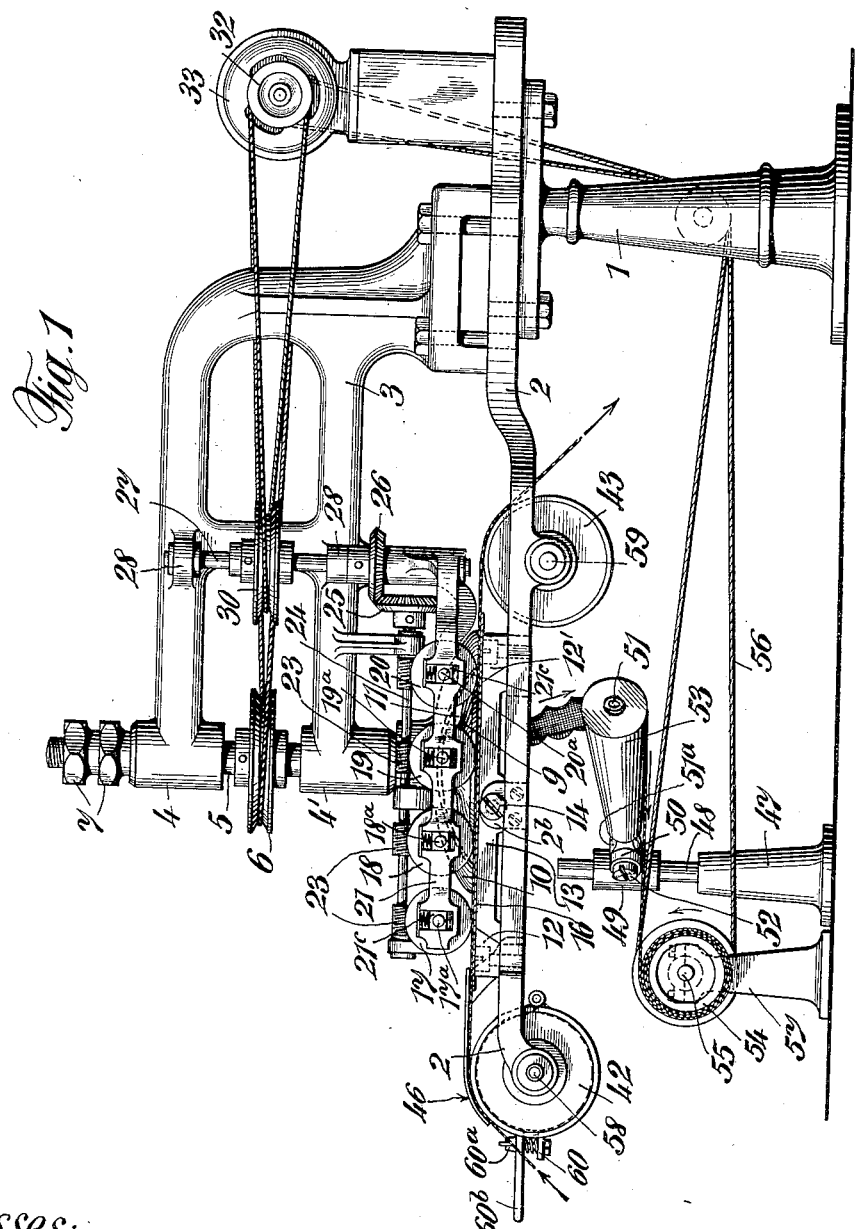

M. SCHOENFELD.
MACHINE FOR CUTTING EMBROIDERIES.
APPLICATION FILED AUG. 22, 1911.

1,094,821.

Patented Apr. 28, 1914.

4 SHEETS—SHEET 1.

Witnesses:
B. Sommers
E. Leckert.

Inventor:
Morris Schoenfeld,
By Henry Orth Jr.
Atty.

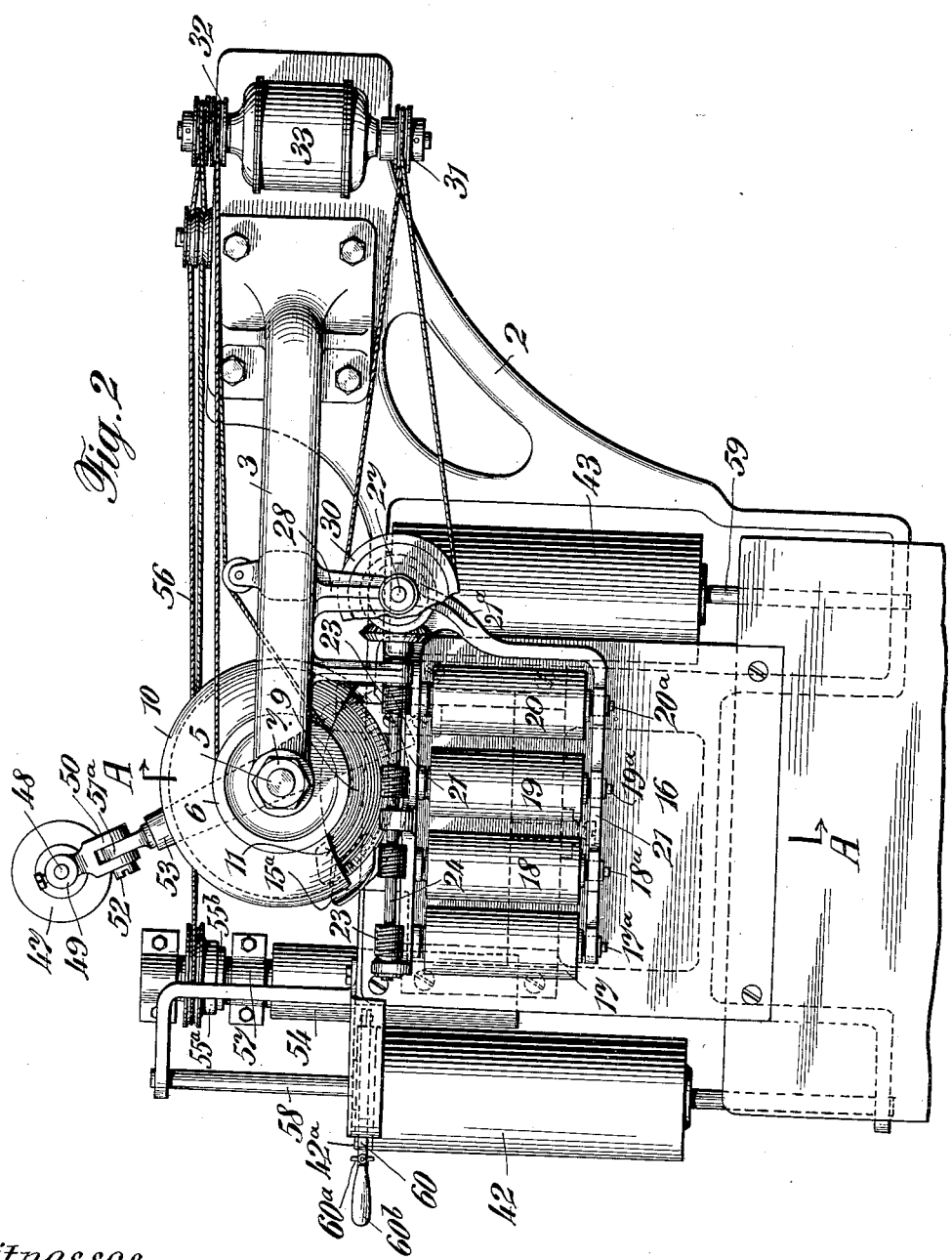

M. SCHOENFELD.
MACHINE FOR CUTTING EMBROIDERIES.
APPLICATION FILED AUG. 22, 1911.
1,094,821.
Patented Apr. 28, 1914.
4 SHEETS—SHEET 3.
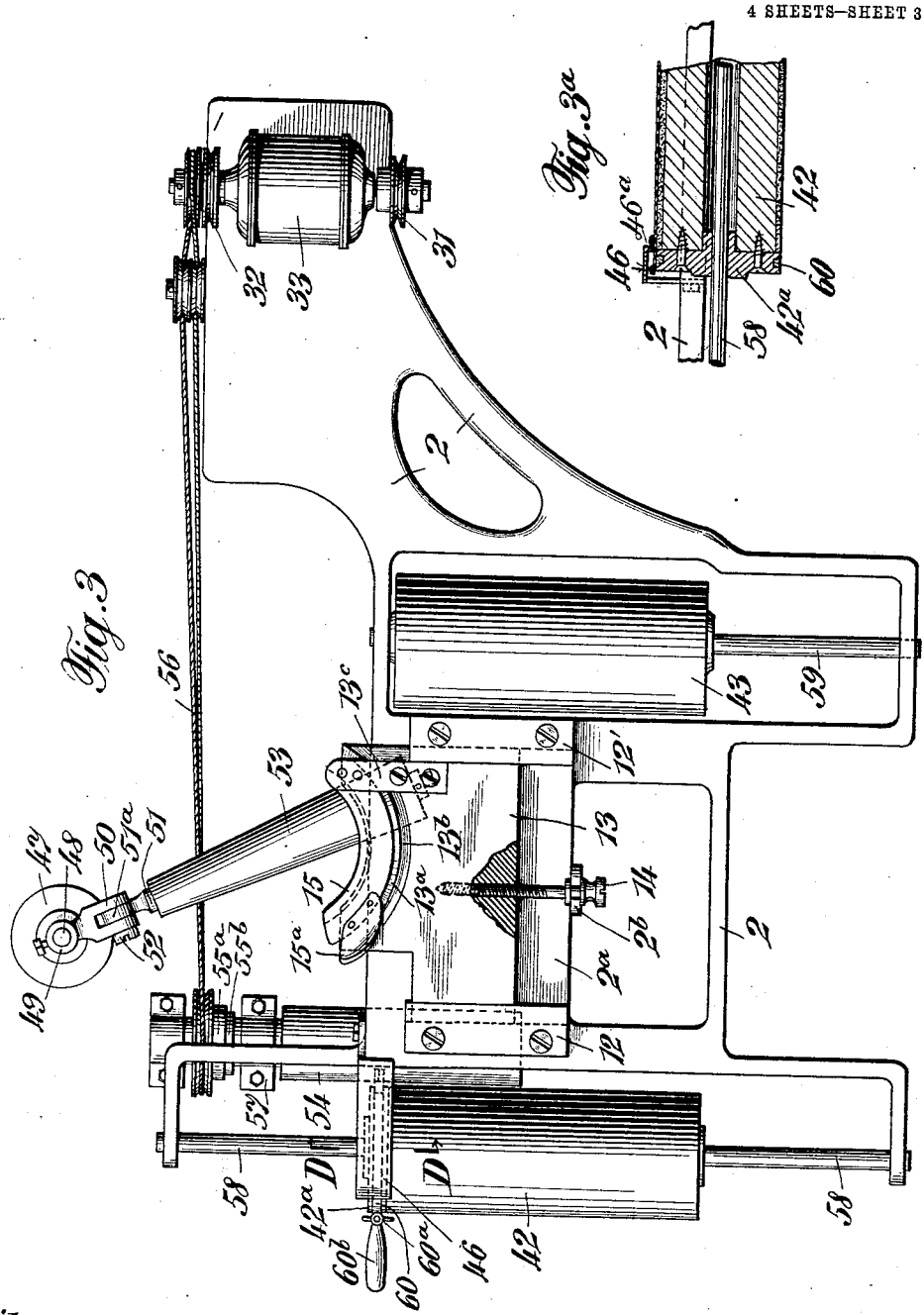
Witnesses:
Inventor:
Morris Schoenfeld M. SCHOENFELD.
MACHINE FOR CUTTING EMBROIDERIES.
APPLICATION FILED AUG. 22, 1911.
1,094,821.
Patented Apr. 28, 1914.
4 SHEETS—SHEET 4.
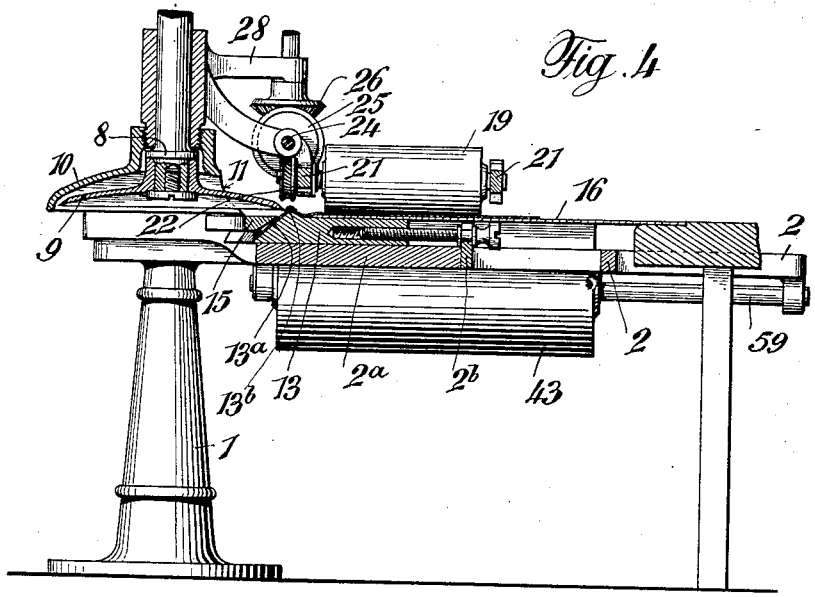
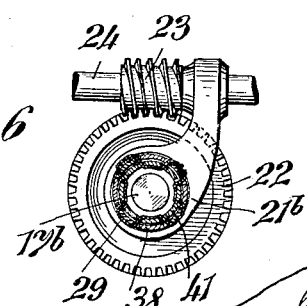
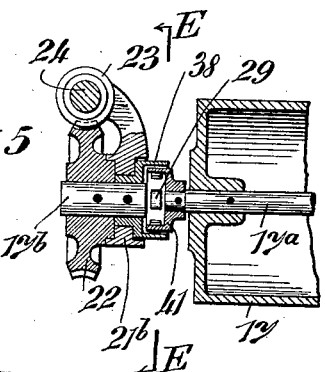
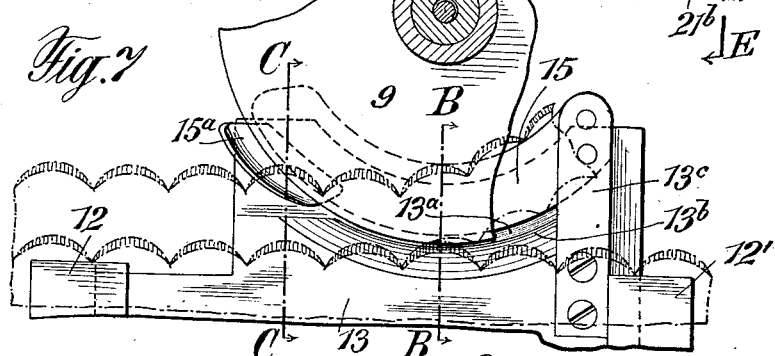
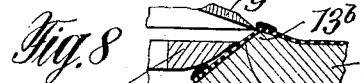
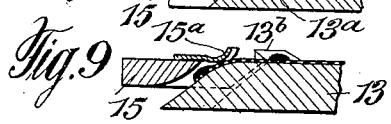

UNITED STATES PATENT OFFICE.

MORRIS SCHOENFELD, OF RORSCHACH, SWITZERLAND.

MACHINE FOR CUTTING EMBROIDERIES.

1,094,821.  Specification of Letters Patent.  Patented Apr. 28, 1914.

Application filed August 22, 1911. Serial No. 645,444.

*To all whom it may concern:*

Be it known that I, MORRIS SCHOENFELD, a citizen of the United States, residing at Mariabergstrasse, Rorschach, Switzerland, have invented new and useful Improvements in Machines for Cutting Embroideries; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to a machine for cutting off strips from embroideries along the embroidery edge. According to this invention the strip after being cut off is guided through a slot in a direction which differs from that in which the main part is led off. The slot is formed by an adjustable stop and a guide fixed to the stop. To obtain an accurate cut the stop is provided with an edged collar corresponding to the form of the knife. The fabric is conveyed by means which may at the same time exert a stretching action on the fabric. The conveying means may be formed by rolls for instance, the peripheral speed of which increases in the direction in which the fabric moves, the rolls being arranged so as to suit the unevenness of the fabric. The latter is led by an axially displaceable roll to the cutting place, a brake being provided for this roll. After the cutting is performed the main part of the fabric is also guided by a roll. A ledge is arranged above the axially displaceable roll so that it causes the fabric to be guided and to move along an embroidery edge. The part of the fabric which is cut off is drawn by suitable means and guided by a device preferably consisting of a conical drum, the direction of the axis of which is adjustable.

A construction according to this invention is illustrated in the accompanying drawings in which—

Figure 1 shows the machine in elevation, Figs. 2 and 3 show a plan view of the same, the upper parts of the machine being omitted in Fig. 3. Fig. 3ª is a partial section on line D—D of Fig. 3, Fig. 4 is a section on line A—A of Fig. 2, Fig. 5 is a partial section through one of the rolls conveying the fabric, Fig. 6 is a section on line E—E of Fig. 5, Fig. 7 illustrates the working of the machine, Fig. 8 is a section on line B—B and Fig. 9 on line C—C of Fig. 7.

A support 2, representing a table 2ª in its middle part, and a fork-shaped bracket 3 are fixed to the standard 1. A vertical shaft 5 is mounted in bearings 4 and 4' at the end of the bracket 3. The lower end of the shaft carries a plate-shaped knife 9. A rope pulley 6 being mounted on the shaft 5 between the bearings 4 and 4' is impelled from any source of energy, by means of an electric motor 33 and a rope pulley 31 for instance. The shaft 5 is fixable in axial direction by adjusting nuts 7 (Fig. 1) and a collar 8 (Fig. 4). A bell-shaped guard 10 which surrounds the knife 9 is screwed to the bearing 4' and provided with an opening 11 on that place on which the fabric is cut. (Fig. 2.) Guides 12 and 12' by which an adjustable stop 13 is guided are fixed on the surface of the table 2ª. This stop can be moved to and fro in the direction to the knife by means of a screw 14 which is guided in a projection 2ᵇ of the table 2ª and which engages threads in the stop 13. The stop is provided with a circular conical cut 13ª which exactly suits the circumference of the knife 9. The stop possesses an edged collar 13ᵇ which follows the upper edge of the cut 13ª.

A guide 15 is fixed to the stop 13 by means of a ledge 13ᶜ. A small slot through which the separated strip of fabric passes is formed between the outer surface of the guide 15 and the inner surface of the stop 13. The upper circular edge of the collar 13ᵇ is arranged somewhat higher than the edge of the knife 9, while the guide 15 is located below the knife 9. A suitably shaped leaf 15ª is secured to the guide so that the fabric can easily be brought in the slot formed by the stop 13 at one side and by the knife 9 and the guide 15 at the other side. This slot is of so small a width that only the embroidery background and not the embroidery can pass through it. The table 2ª is covered by a thin plate 16 producing thus a plain support for the fabric.

Rolls 17, 18, 19 and 20 mounted over the plate 16 of the table 2ª convey the fabric to be cut. The axles 17ª, 18ª, 19ª and 20ª of the rolls are rotatably supported by parts 21ᶜ elastically mounted in a fork 21 which is fastened to the bracket 3 (Fig. 1). Thus the rolls are adapted to suit the unevenness of the fabric. The rolls may be impelled by the motor 33 for instance by means of the pulley 32 on the shaft of the motor and a rope pulley 30 mounted on a vertical shaft. The shaft 27 is rotatably supported by the bearings 28 and a projection 21$^a$ of the fork 21 and carries a bevel gear wheel 26. This wheel engages a bevel wheel 25 secured to a shaft 24 which is supported by the fork 21. The shaft 24 carries four worms 23 which engage worm wheels 22 mounted on the axle 17$^b$. (Fig. 5). The hubs of the worm wheels 22 are rotatably supported by projections 21$^b$ of the fork 21. The axles 17$^a$, 18$^a$, 19$^a$ and 20$^a$ are connected to the axle 17$^b$ by means of coupling parts 38, 41 and a belt 29 (Figs. 5 and 6). The parts 38 of the couplings are supported by the projections 21$^b$ and rigidly connected to the axle 17$^b$, while the parts 41 are rigidly connected to the axles 17$^a$—20$^a$. The rolls are impelled so that the peripheral speed of the conveyer rolls 17—20 increases in the direction in which the fabric moves. For this end the number of teeth of the four worm wheels may decrease in the direction in which the fabric moves, each worm wheel may be provided with one tooth less than the preceding wheel for instance, so that the speed of the roll 17 is the smallest and the speed of the roll 20 the largest. The increase of the peripheral speed could also be attained by changing the diameters of the rolls, whereby the diameter of the roll 17 is the smallest and the diameter of the roll 20 the largest.

On both sides of the conveyer rolls 17—20 two other wooden rolls for instance 42 and 43 are arranged, which are displaceably mounted on the axles 58 and 59. These axles are mounted on the support 2 so that the upper surface of the same is at the same level as the plate 16. The rolls are provided at one side with a cover 42$^a$ of metal which is provided on its surface with an annular notch. A ring 60, which can be clamped by a thumb-screw 60$^a$ is mounted in this notch. The ring 60 and the roll 42 can axially be displaced by moving the handle 60$^b$. The roll 42 may also be braked by the above described device. The rolls 42 and 43 are provided with a cover of plush. A shield 46 secured to the table 2$^a$ is mounted above the roll 42 on the side of the knife 9. One part of the shield is bent according to the surface of the roll, while the other part is plain (Fig. 1). The part 46$^a$ of the shield (Fig. 3) which is parallel to the cylindrical surface of the roll 42, is fixed in such distance from the roll that an embroidered part of the fabric can just pass through the space between the part 46$^a$ and the roll 42. The flange 46$^a$ of the shield extends so near to the roll that the space between the ledge and the roll is only as large as to allow the background to pass but not the embroidery.

For guiding the separated portion of the fabric a vertical rod 48 is mounted on a standard 1 and carries adjustably a clamping device 49 which is provided with a fork shaped bearing 50 for a ring 51$^a$ mounted on an axle 51. The ring and the axle can be fixed in their position by means of a screw 52. The axle carries a drum of the shape of a truncated cone. A cylindrical drum 54 is secured to the shaft 55. This shaft is supported only at one end at 57. This shaft may also be impelled from the motor 33 by a rope drive 56 and a friction coupling 55$^a$, 55$^b$. The fabric is stretched by the cone 53 and may be wound up on the drum 54 or any other conveying device.

The machine operates as follows: The fabric to be cut is guided by the roll 42 and can be brought in any desired position by moving the handle 60$^b$. By means of the conveyer rolls 17—20 which are adapted singly to suit the unevenness of the fabric, the fabric, supported on the table 16, is conveyed to the rotating knife 9 and, as a consequence of the different peripheral speeds of the rolls, submitted to a stretching action which is increasing in the direction in which the fabric moves. By the fabric passing the edge of the collar 13$^b$ the accuracy of the cut is much increased. The distance of the fabric and the knife can be adjusted by means of the screw 14 which acts on the stop 13. The main part of the fabric is carried over the roll 43 while the separated strip is guided by the conical drum 53 through the slot between the stop 13 and the guide 15 and wound up thereafter on the drum 54. By this means the necessary tension is imparted to the separated strip by the cone 53. Since the axis of the cone can be brought in every desired direction, a strip of any desired width can be carried away in a stretched condition. It is of importance therefor that the separated strip and the main part of the fabric are led away in different directions. In some cases it will be desirable to drive the means conveying the main part and the means conveying the separated strip at different speeds. By the manner of guiding the main part and the separated strip an unstretched part of the fabric will be formed at the cutting place.

Instead of rigidly securing the rolls 17—20 to the axles 17$^a$ to 20$^a$, the rolls could also be mounted free to rotate on these axles. In this case the rolls may be impelled by a laterally arranged friction-coupling. Moreover the first of the conveyer rolls, that means the roll 17 may be positively impelled, forming thus a conveying device, while the other rolls 18—20 act as a stretching device.

Any suitable device may be used instead of the stretching device as described above. For instance the table supporting the fabric may be omitted and the latter carried by a conveyer band. The fabric may be led to the band by suitably arranged conveyer rolls whereby the band is impelled at a higher speed than the rolls. The fabric is pressed against the conveyer bands by suitable independent elements, which may be formed by rolls for instance that are movable in the direction rectangular to their axis.

What I claim as new and desire to secure by Letters Patent of the United States is:—

1. In a machine for cutting fabric along an embroidered edge, a support for the fabric to be cut, a revoluble knife arranged substantially in the plane of the fabric, means for propelling the main portion of the fabric and adapted to affect the same beyond the point of cutting, means for retarding the feed of the fabric and acting thereon in advance of the point of cutting, whereby the main portion of the fabric will be propelled and simultaneously stretched in the direction of its movement, and means for directing the severed portion of the fabric downwardly below the knife in a different direction to the movement of the main portion.

2. In a machine for cutting fabric along an embroidered edge, a revoluble knife, a bed plate, a stationary guide for guiding the severed strip between the knife and bed plate and adapted to guide the severed portion of the fabric below the knife, means for conducting and simultaneously stretching the main part of the fabric and adapted to stretch the fabric in the direction in which it is moved, to prevent the embroidered edge from being drawn into contact with the cutting edge of the knife.

3. In a machine for cutting fabric along an embroidered edge, a revoluble knife, disposed substantially in the same plane as the fabric, means for propelling the main part of the fabric to and from the place of cutting, a stationary guide for guiding the separated strip of fabric below the knife and consisting of means forming a slot for the passage therethrough of the severed portion of the fabric, said slot being defined by surfaces with which both surfaces of the severed fabric contact.

4. In a machine for cutting fabric along an embroidered edge, a revoluble knife, disposed substantially in the same plane as the fabric, means for propelling the main part of the fabric to and from the place of cutting, a stationary guide for guiding the separated strip of fabric below the knife and consisting of means forming a slot for the passage therethrough of the severed portion of the fabric, said slot being defined by surfaces with which both surfaces of the severed fabric contact, and means acting on the severed portion of the fabric to propel the same through said slot.

5. In a machine for cutting fabric along an embroidered edge, a support for the fabric to be cut, a revoluble knife arranged to cut the fabric as it is moved over the support, means for feeding the fabric and means for smoothing the fabric where it passes said knife, comprising means coöperating to press the fabric on the support and means for operating the same so as to move faster than the fabric to cause the same to frictionally smooth the fabric.

6. In a machine for cutting embroidery, a circular revoluble knife, means for supporting the main portion of the fabric in substantially the same plane as the knife, means for propelling the fabric in relation to the knife so that the latter will sever the fabric along an embroidered edge, and guiding means, comprising means extending from below the plane of the knife edge around the knife edge and above the plane thereof, and arranged to contact with the top surface of that portion of the fabric which is being severed from the main portion.

7. In a machine for cutting embroidery, a circular revoluble knife, a guide adjustable relative to the knife and arranged to guide the embroidered fabric relative to the knife whereby the fabric will travel substantially in the same plane as the knife and whereby the knife will cut through the plain portion of the fabric but wherein the space between said guide and the knife will prevent the passage of the embroidered portion of the fabric, a stop arranged below the knife and movable with said guide, the said stop and guide being arranged with an intermediate slot directed downwardly, means for propelling the main portion of the fabric, and means for propelling the separated strip through said slot.

8. In a machine for cutting embroidery a circular revoluble knife, means for supporting the main portion of the fabric in substantially the same plane as the knife, means for propelling the main portion of the fabric in relation to the knife so that the latter will sever the fabric along an embroidered edge, guiding means, comprising a plate extending from below the plane of the knife edge across and above said plane and arranged to contact with the top surface of the portion of the fabric which is being severed from the main portion, and means for propelling the severed portion of the fabric downwardly from the point of cutting.

9. In a machine for cutting embroidery, a circular revoluble knife, a fabric support arranged substantially in the same plane as the knife edge, having a projection in juxtaposition to the knife edge, rising above the cutting edge of the knife and conforming to the peripheral shape of the knife and means for propelling the main part of the fabric.

10. In a machine for cutting embroidery, a circular revoluble knife, means for propelling the main piece of fabric in a direct line toward and from the point of cutting and for simultaneously exerting a stretching action thereon, arranged to affect the fabric in advance of and also beyond the point of cutting, and means for guiding the separated strip of material in a different direction from the movement of the main fabric.

11. In a machine for cutting embroidery, a horizontally disposed circular revoluble knife, means for propelling the main piece of fabric substantially in the plane of the knife and with the embroidery edge approaching the point of cutting in a direction tangentially of the knife edge, and away from the point of cutting in a direct line, and means for guiding the severed strip in a different direction to the movement of the main fabric.

12. In a machine for cutting embroidery along an embroidered edge, a movable knife, a guard for the knife provided with a cut on that place on which the fabric is cut, fabric guiding means having a slot arranged near the knife, means for conveying the main part of the fabric and means for conveying the separated strip of fabric through said slot in a different direction from the direction in which the main part moves, substantially as described.

13. In a machine for cutting embroidery along an embroidered edge, a movable knife, an adjustable stop, a guide fixed to the stop, a leaf secured to said guide, said stop and said guide being formed with a guiding slot between them, means for conveying the main part of the fabric and means for conveying the separated strip of fabric through said slot in a different direction from the direction in which the main part moves, substantially as described.

14. In a machine for cutting embroidery along an embroidered edge, a movable knife, fabric guiding means having a slot arranged near the knife, a table supporting the fabric, means arranged over said table conveying and at the same time stretching the fabric and means for conveying the separated strip of fabric through said slot in a different direction from the direction in which the main part moves, substantially as described.

15. In a machine for cutting embroidery along an embroided edge, a movable knife, fabric guiding means having a slot arranged near the knife, a table supporting the fabric, means arranged over said table conveying and at the same time stretching the fabric, said means being adapted singly to suit the unevenness of the fabric and means conveying the separated strip of fabric through said slot in a different direction from the direction in which the main part moves, substantially as described.

16. In a machine for cutting embroidery along an embroidered edge, a movable knife, fabric guiding means having a slot arranged near the knife, a table supporting the fabric, means arranged over said table conveying and at the same time stretching the fabric, the stretching action increasing in the direction in which the fabric moves and means conveying the separated strip of fabric through said slot in a different direction from the direction in which the main part moves, substantially as described.

17. In a machine for cutting embroidery along an embroidered edge, a movable knife, fabric guiding means having a slot arranged near the knife, a table supporting the fabric, conveyer rolls arranged over said table, and means conveying the separated strip of fabric through said slot in a different direction from the direction in which the main part moves, substantially as described.

18. In a machine for cutting embroidery along an embroidered edge, a movable knife, fabric guiding means having a slot arranged near the knife, a table supporting the fabric, conveyer rolls arranged over said table, means for propelling the conveyer rolls so that the peripheral speed of the rolls increases in the direction in which the fabric moves and means conveying the separated strip of fabric through said slot in a different direction from the direction in which the main part moves, substantially as described.

19. In a machine for cutting embroidery along an embroidered edge, a movable knife, a guard for the knife provided with a cut on that place on which the fabric is cut, an adjustable stop provided with an edge collar corresponding with the form of the knife, a guide fixed to the stop, a leaf secured to said guide, said stop and said guide being formed with a guiding slot therebetween, a table supporting the fabric, conveyer rolls arranged over said table, means for propelling the conveyer rolls so that the peripheral speed of the rolls increases in the direction in which the fabric moves, and means conveying the separated strip of fabric through said slot in a different direction from the direction in which the main part moves, substantially as described.

20. In a machine for cutting embroidery along an embroidered edge, a movable knife, fabric guiding means having a slot arranged near the knife, a roll guiding the fabric to the cutting place, means for conveying the main part of the fabric and means for conveying the separated strip of fabric through said slot in a different direction from the direction in which the main part moves, substantially as described.

21. In a machine for cutting embroidery along an embroidered edge, a movable knife, fabric guiding means having a slot arranged near the knife for the passage of the severed fabric, an axially movable let off roller acting in advance of the knife to let off and guide the fabric to the knife, means for conveying the main portion of the fabric and means for conveying the separated portion of fabric through said slot in a different direction to the said main portion.

22. In a machine for cutting embroidery along an embroidered edge, a movable knife, fabric guiding means having a slot arranged near the knife, an axially movable roll guiding the fabric to the cutting place, means for exerting a braking action on the axially movable roll, means for conveying the main part of the fabric and means for conveying the separated strip of fabric through said slot in a different direction from the direction in which the main part moves, substantially as described.

23. In a machine for cutting embroidery along an embroidered edge, a movable knife, fabric guiding means having a slot arranged near the knife, means for conveying the main part of the fabric, means for guiding the separated strip of the fabric through said slot in a different direction from the direction in which the main part moves, means for adjusting the means which guides the separated strip of fabric relative to the knife and means for conveying the separated strip of fabric, substantially as described.

24. In a machine for cutting embroidery along an embroidered edge, a movable knife, fabric guiding means having a slot arranged near the knife, an axially movable roll guiding the fabric to the cutting place, a ledge mounted over said axially movable roll causing the fabric to be guided and to move along an embroidered edge, means for conveying the main part of the fabric and means for conveying the separated strip of the fabric through said slot in a different direction from the direction in which the main part moves, substantially as described.

25. In a machine for cutting embroidery along an embroidered edge, a movable knife, fabric guiding means having a slot arranged near the knife, means for conveying the main part of the fabric and means for conveying the separated strip of fabric through said slot in a different direction from the direction in which the main part moves, the means for conveying the main part being independent from the means for conveying the separated strip, substantially as described.

26. In a machine for cutting embroidery along an embroidered edge, a movable knife, fabric guiding means having a slot arranged near the knife, means for conveying the main part of the fabric and means for conveying the separated strip of fabric through said slot in a different direction from the direction in which the main part moves, the means for conveying the main part and the means for conveying the separated strip moving at different speeds, substantially as described.

27. In a machine for cutting embroidery along an embroidered edge, a movable knife, fabric guiding means having a slot arranged near the knife, means for conveying the main part of the fabric, means for guiding the separated strip of fabric through said slot in a different direction from the direction in which the main part moves, means for conveying the separated strip of the fabric and a friction-coupling connecting said latter means to propelling means, substantially as described.

In testimony that I claim the foregoing as my invention, I have signed my name in presence of two subscribing witnesses.

MORRIS SCHOENFELD.

Witnesses:
　OSCAR ZOAB,
　RANDALL ATKINSON.